(12) United States Patent
Bares et al.

(10) Patent No.: US 11,055,498 B2
(45) Date of Patent: *Jul. 6, 2021

(54) RFID READER DISCIPLINE

(71) Applicant: Zest Labs, Inc., San Jose, CA (US)

(72) Inventors: William Henry Bares, Los Gatos, CA (US); Peter Arnold Mehring, Los Altos, CA (US)

(73) Assignee: Zest Labs, Inc., San Jose, CA (US)

( * ) Notice: Subject to any disclaimer, the term of this patent is extended or adjusted under 35 U.S.C. 154(b) by 553 days.

This patent is subject to a terminal disclaimer.

(21) Appl. No.: 15/729,417

(22) Filed: Oct. 10, 2017

(65) Prior Publication Data

US 2018/0032762 A1 Feb. 1, 2018

Related U.S. Application Data

(63) Continuation of application No. 12/350,804, filed on Jan. 8, 2009, now Pat. No. 9,805,222.

(51) Int. Cl.
*G06K 7/00* (2006.01)
*G06K 7/10* (2006.01)

(52) U.S. Cl.
CPC ....... *G06K 7/0008* (2013.01); *G06K 7/10356* (2013.01); *G06K 7/10475* (2013.01)

(58) Field of Classification Search
CPC combination set(s) only.
See application file for complete search history.

(56) References Cited

U.S. PATENT DOCUMENTS

| 7,969,282 | B2 * | 6/2011 | Powell | G06K 7/10356 340/10.2 |
| 9,805,222 | B2 * | 10/2017 | Bares | G06K 7/0008 |
| 2006/0022815 | A1 * | 2/2006 | Fischer | G06K 7/0008 340/505 |
| 2006/0092040 | A1 * | 5/2006 | Fishkin | G06K 7/10079 340/10.1 |
| 2006/0158313 | A1 * | 7/2006 | Satou | G06K 7/0008 340/10.2 |
| 2007/0046467 | A1 * | 3/2007 | Chakraborty | G06K 7/0008 340/572.1 |
| 2007/0057057 | A1 * | 3/2007 | Andresky | G06K 7/0008 235/451 |

(Continued)

*Primary Examiner* — Travis R Hunnings
(74) *Attorney, Agent, or Firm* — Zilka-Kotab, P.C.

(57) ABSTRACT

A method for coordinating reader transmissions, according to one embodiment, includes: at a first reader, receiving from a second reader a request to transmit to a RFID tag; determining whether the first reader is transmitting; and sending a denial of the request from the first reader to the second reader in response to determining that the first reader is transmitting. A method, according to another embodiment, includes: from a first reader, sending to a plurality of readers a request to transmit to a RFID tag; waiting for responses from the plurality of readers; not transmitting to the RFID tag in response to the first reader receiving a denial of the request from any of the readers; and transmitting to the RFID tag in response to the first reader not receiving a denial of the request from any of the readers. Additional systems, methods and computer program products are presented.

14 Claims, 6 Drawing Sheets

(56) References Cited

U.S. PATENT DOCUMENTS

| | | | |
|---|---|---|---|
| 2007/0126554 A1* | 6/2007 | Choi | G06K 7/0008 340/10.1 |
| 2007/0139163 A1* | 6/2007 | Powell | G06K 7/10356 340/10.2 |
| 2008/0129485 A1* | 6/2008 | Tuttle | G06K 7/0008 340/539.11 |
| 2008/0130593 A1* | 6/2008 | Scheinert | H04W 8/30 370/337 |
| 2008/0297312 A1* | 12/2008 | Moshfeghi | H04L 47/10 340/10.1 |

\* cited by examiner

RFID READER DISCIPLINE

FIELD OF THE INVENTION

The present invention relates to Radio Frequency (RF) devices, and more particularly, this invention relates to RF systems and methods to eliminate interference between RF devices.

BACKGROUND OF THE INVENTION

The use of Radio Frequency Identification (RFID) tags are quickly gaining popularity for use in the monitoring and tracking of an item. RFID technology allows a user to remotely store and retrieve data in connection with an item utilizing a small, unobtrusive tag. As an RFID tag operates in the radio frequency (RF) portion of the electromagnetic spectrum, an electromagnetic or electrostatic coupling can occur between an RFID tag affixed to an item and an RFID tag reader. This coupling is advantageous, as it precludes the need for a direct contact or line of sight connection between the tag and the reader.

RF devices in proximity to each other can interfere with each other unless there is a method of coordinating their operation. This interference can render the RF devices inoperable. One currently used method to avoid this interference is to have all devices attached, in some way, to a central coordinating device. This method is called reader orchestration. Reader orchestration introduces additional requirements and complexity in the central coordinating device and in the applications that are attempting to use the RF devices' capabilities. This method also introduces a single point of failure into the system. Therefore, it would be advantageous to have a method which could be integrated into each RF device to overcome interference issues between RF devices without using a central coordinating device.

SUMMARY OF THE INVENTION

A method for coordinating reader transmissions, according to one embodiment, includes: at a first reader, receiving from a second reader a request to transmit to a RFID tag; in response to receiving the request, determining whether the first reader is transmitting; and sending a denial of the request from the first reader to the second reader in response to determining that the first reader is transmitting.

A method for coordinating reader transmissions, according to another embodiment, includes: from a first reader, sending to a plurality of readers a request to transmit to a RFID tag, the request being directed to the readers; waiting for responses from the plurality of readers; not transmitting to the RFID tag in response to the first reader receiving a denial of the request from any of the readers; and transmitting to the RFID tag in response to the first reader not receiving a denial of the request from any of the readers.

A method for coordinating reader transmissions, according to yet another embodiment, includes: for a first of a plurality of readers, determining whether the first reader and any other of the readers interfere with each other; and storing a result of the determination; wherein the first reader sends a request to transmit to those readers determined to interfere with the first reader or vice versa prior to transmitting to a RFID tag, the request to transmit being directed to those readers determined to interfere with the first reader or vice versa; wherein the first reader does not transmit to the RFID tag in response to the first reader receiving a denial of the request from any of the readers the request was sent to; and wherein the first reader transmits to the RFID tag in response to the first reader not receiving a denial of the request from any of the readers the request was sent to.

A system, according to one embodiment, includes: a processing circuit; memory coupled to the processing circuit; and an antenna coupled to the processing circuit, wherein the processing circuit is configured to: at a first reader, receive from a second reader a request to transmit to a RFID tag; and send a denial of the request from the first reader to the second reader when the first reader is transmitting upon receiving the request from the second reader.

A computer program product, according to one embodiment, includes a non-transitory computer readable medium having computer code thereon, which when executed by a reader causes the reader to: receive, by the reader, a request to transmit to a RFID tag from a remote reader; and send, by the reader, a denial of the request to the remote reader when the reader is transmitting upon receiving the request from the remote reader.

A system, according to another embodiment, includes: a processing circuit; memory coupled to the processing circuit; and an antenna coupled to the processing circuit, wherein the processing circuit is configured to: from a first reader, send to a plurality of readers a request to transmit to a RFID tag, the request being directed to the readers; wait for responses from the plurality of readers; not transmit to the RFID tag in response to the first reader receiving a denial of the request from any of the readers; and transmit to the RFID tag in response to the first reader not receiving a denial of the request from any of the readers.

A computer program product, according to another embodiment, includes a non-transitory computer readable medium having computer code thereon, which when executed by a reader causes the reader to: send to a plurality of readers a request to transmit to a RFID tag, the request being directed to the readers; wait for responses from the plurality of readers; not transmit to the RFID tag in response to the first reader receiving a denial of the request from any of the readers; and transmit to the RFID tag in response to the first reader not receiving a denial of the request from any of the readers.

A system, according to yet another embodiment, includes: a processing circuit; memory coupled to the processing circuit; and an antenna coupled to the processing circuit, wherein the processing circuit is configured to: determine whether a first of a plurality of readers and any other of the readers interfere with each other; store a result of the determination; store a request to transmit from the first reader to those readers determined to interfere with the first reader or vice versa prior to transmitting to a RFID tag, the request to transmit being directed to those readers determined to interfere with the first reader or vice versa; not transmit to the RFID tag in response to the first reader receiving a denial of the request from any of the readers receiving the request; and transmit to the RFID tag in response to the first reader not receiving a denial of the request from any of the readers receiving the request.

A computer program product, according to yet another embodiment, includes a non-transitory computer readable medium having computer code thereon, which when executed by a reader causes the reader to: determine whether a first of a plurality of readers and any other of the readers interfere with each other; and store a result of the determination; send a request to transmit from the first reader to those readers determined to interfere with the first reader or vice versa prior to transmitting to a RFID tag, the request to transmit being directed to those readers determined to interfere with the first reader or vice versa; not transmit to the RFID tag in response to the first reader receiving a of the request from any of the readers receiving the request; and transmit to the RFID tag in response to the first reader not receiving a denial of the request from any of the readers receiving the request.

Any of these embodiments may be implemented in an RFID system, which may include an RFID tag and/or interrogator.

Other aspects, advantages and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
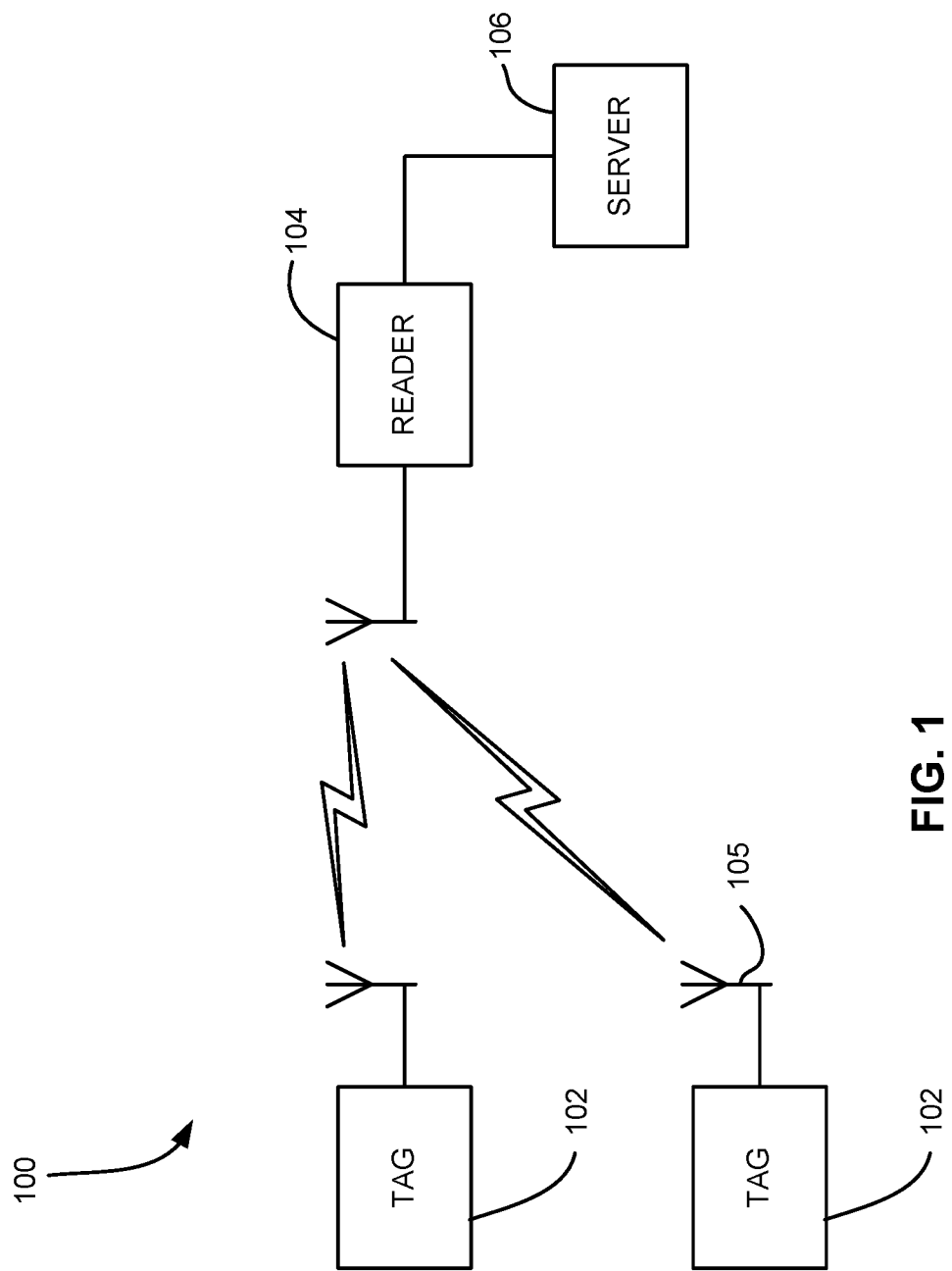
FIG. 1 is a system diagram of an RFID system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a method for coordinating reader transmissions includes: at a first reader, receiving from a second reader a request to transmit to a RFID tag; in response to receiving the request, determining whether the first reader is transmitting; and sending a denial of the request from the first reader to the second reader in response to determining that the first reader is transmitting.

In another general embodiment, a method for coordinating reader transmissions includes: from a first reader, sending to a plurality of readers a request to transmit to a RFID tag, the request being directed to the readers; waiting for responses from the plurality of readers; not transmitting to the RFID tag in response to the first reader receiving a denial of the request from any of the readers; and transmitting to the RFID tag in response to the first reader not receiving a denial of the request from any of the readers.

In yet another general embodiment, a method for coordinating reader transmissions includes: for a first of a plurality of readers, determining whether the first reader and any other of the readers interfere with each other; and storing a result of the determination; wherein the first reader sends a request to transmit to those readers determined to interfere with the first reader or vice versa prior to transmitting to a RFID tag, the request to transmit being directed to those readers determined to interfere with the first reader or vice versa; wherein the first reader does not transmit to the RFID tag in response to the first reader receiving a denial of the request from any of the readers the request was sent to; and wherein the first reader transmits to the RFID tag in response to the first reader not receiving a denial of the request from any of the readers the request was sent to.

In one general embodiment, a system includes: a processing circuit; memory coupled to the processing circuit; and an antenna coupled to the processing circuit, wherein the processing circuit is configured to: at a first reader, receive from a second reader a request to transmit to a RFID tag; and send a denial of the request from the first reader to the second reader when the first reader is transmitting upon receiving the request from the second reader.

In another general embodiment, a computer program product includes a non-transitory computer readable medium having computer code thereon, which when executed by a reader causes the reader to: receive, by the reader, a request to transmit to a RFID tag from a remote reader; and send, by the reader, a denial of the request to the remote reader when the reader is transmitting upon receiving the request from the remote reader.

In another general embodiment, a system includes: a processing circuit; memory coupled to the processing circuit; and an antenna coupled to the processing circuit, wherein the processing circuit is configured to: from a first reader, send to a plurality of readers a request to transmit to a RFID tag, the request being directed to the readers; wait for responses from the plurality of readers; not transmit to the RFID tag in response to the first reader receiving a denial of the request from any of the readers; and transmit to the RFID tag in response to the first reader not receiving a denial of the request from any of the readers.

In another general embodiment, a computer program product includes a non-transitory computer readable medium having computer code thereon, which when executed by a reader causes the reader to: send to a plurality of readers a request to transmit to a RFID tag, the request being directed to the readers; wait for responses from the plurality of readers; not transmit to the RFID tag in response to the first reader receiving a denial of the request from any of the readers; and transmit to the RFID tag in response to the first reader not receiving a denial of the request from any of the readers.

In yet another general embodiment, a system includes: a processing circuit; memory coupled to the processing circuit; and an antenna coupled to the processing circuit, wherein the processing circuit is configured to: determine whether a first of a plurality of readers and any other of the readers interfere with each other; store a result of the determination; store a request to transmit from the first reader to those readers determined to interfere with the first reader or vice versa prior to transmitting to a RFID tag, the request to transmit being directed to those readers determined to interfere with the first reader or vice versa; not transmit to the RFID tag in response to the first reader receiving a denial of the request from any of the readers receiving the request; and transmit to the RFID tag in response to the first reader not receiving a denial of the request from any of the readers receiving the request.

In yet another general embodiment, a computer program product includes a non-transitory computer readable medium having computer code thereon, which when executed by a reader causes the reader to: determine whether a first of a plurality of readers and any other of the readers interfere with each other; and store a result of the determination; send a request to transmit from the first reader to those readers determined to interfere with the first reader or vice versa prior to transmitting to a RFID tag, the request to transmit being directed to those readers determined to interfere with the first reader or vice versa; not transmit to the RFID tag in response to the first reader receiving a of the request from any of the readers receiving the request; and transmit to the RFID tag in response to the first reader not receiving a denial of the request from any of the readers receiving the request.

FIG. 1 depicts an RFID system 100 according to one of the various embodiments, which may include some or all of the following components and/or other components. As shown in FIG. 1, one or more RFID devices 102 are present. Each RFID device 102 in this embodiment includes a controller and memory, which are preferably embodied on a single chip as described below, but may also or alternatively include a different type of controller, such as an application specific integrated circuit (ASIC), processor, an external memory module, etc. For purposes of the present discussion, the RFID devices 102 will be described as including a chip. Each RFID device 102 may further include or be coupled to an antenna 105.

An illustrative chip is disclosed below, though actual implementations may vary depending on how the device is to be used. In general terms, a preferred chip includes one or more of a power supply circuit to extract and regulate power from the RF reader signal; a detector to decode signals from the reader; a backscatter modulator, a transmitter to send data back to the reader; anti-collision protocol circuits; and at least enough memory to store its unique identification code, e.g., Electronic Product Code (EPC).

While RFID devices 102 according to some embodiments are functional RFID tags, other types of RFID devices 102 include merely a controller with on-board memory, a controller and external memory, etc.

Each of the RFID devices 102 may be coupled to an object or item, such as an article of manufacture, a container, a device, a person, etc.

With continued reference to FIG. 1, a remote device 104 such as an interrogator or "reader" communicates with the RFID devices 102 via an air interface, preferably using standard RFID protocols. An "air interface" refers to any type of wireless communications mechanism, such as the radio-frequency signal between the RFID device and the remote device. The RFID device 102 executes the computer commands that the RFID device 102 receives from the remote device 104 (e.g., reader).

The system 100 may also include an optional backend system such as a server 106, which may include databases containing information and/or instructions relating to RFID tags and/or tagged items.

As noted above, each RFID device 102 may be associated with a unique identifier. Such identifier is preferably an EPC code. The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:

1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering systems into their native (human-readable) forms.

Each RFID device 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifier(s) or reference key(s).

RFID systems may use reflected or "backscattered" radio frequency (RF) waves to transmit information from the RFID device 102 to the remote device 104, e.g., reader. Since passive (Class-1 and Class-2) tags get all of their power from the reader signal, the tags are only powered when in the beam of the remote device 104.

The Auto ID Center EPC-Compliant tag classes are set forth below:
Class-1
Identity tags (RF user programmable, range ~3 m)
Lowest cost
Class-2
Memory tags (20 bit address space programmable at ~3 m range)
Security & privacy protection
Low cost
Class-3
Semi-passive tags (also called semi-active tags and battery assisted passive (BAP) tags)
Battery tags (256 bits to 2M words)
Self-Powered Backscatter (internal clock, sensor interface support)
~100 meter range
Moderate cost
Class-4
Active tags
Active transmission (permits tag-speaks-first operating modes)
~300 to ~1,000 meter range
Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (e.g., semi-active, semi-passive or battery-assisted), batteries are the most common form of power. This greatly increases read range, and the reliability of tag reads, because the tag does not need power from the reader to respond. Class-3 tags only need a 5 mV signal from the reader in comparison to the 500 mV that Class-1 and Class-2 tags typically need to operate. This 100:1 reduction in power requirement along with the reader's ability to sense a very small backscattered signal permits Class-3 tags to operate out to a free space distance of 100 meters or more compared with a Class-1 range of only about 3 meters. Note that semi-passive and active tags with built in passive mode may also operate in passive mode, using only energy captured from an incoming RF signal to operate and respond, at a shorter distance up to 3 meters.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. Ultra high-frequency (860 MHz to 960 MHz and 2.4 GHz to 2.5 GHz) tags offer increased read ranges and high reading speeds.

A basic RFID communication between an RFID device and a remote device typically begins with the remote device, e.g., reader, sending out signals via radio wave to find a particular RFID device, e.g., tag via singulation or any other method known in the art. The radio wave hits the RFID device, and the RFID device recognizes the remote device's signal and may respond thereto. Such response may include exiting a hibernation state, sending a reply, storing data, etc.

Figure 2A:
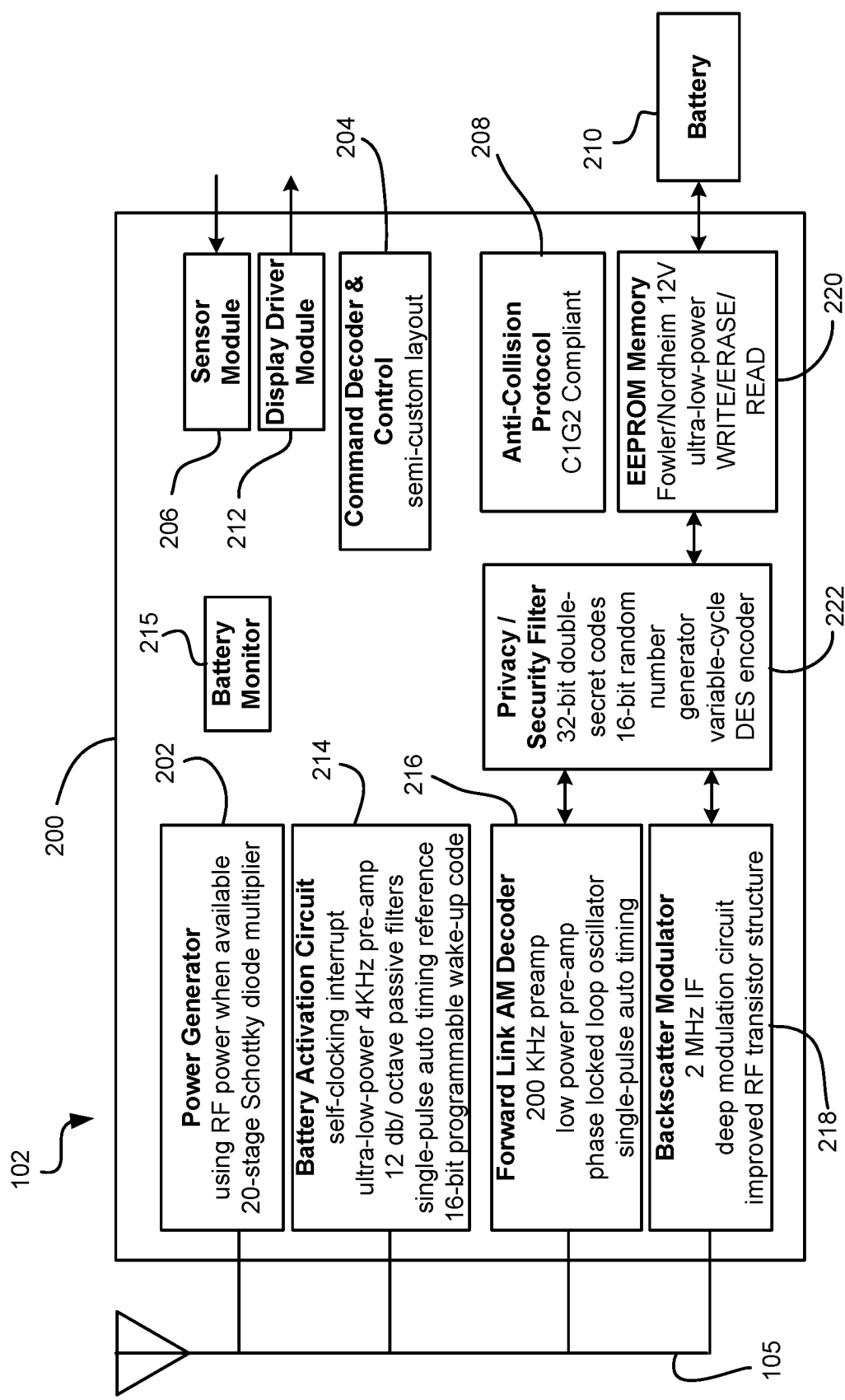
FIG. 2A is a system diagram for an integrated circuit (IC) chip for implementation in an RFID device.

Embodiments of the RFID device are preferably implemented in conjunction with a Class-3 or higher Class IC chip, which typically contains the processing and control circuitry for most if not all tag operations. FIG. 2A depicts a circuit layout of a module 200, which may be a Class-3 IC, along with the various control circuitry according to an illustrative embodiment for implementation in an RFID tag 102. It should be kept in mind that the present invention can be implemented using any type of RFID device, and the module 200 circuitry is presented as only one possible implementation.

The Class-3 IC of FIG. 2A can form the core of RFID chips appropriate for many applications such as identification of pallets, cartons, containers, vehicles, or anything where a range of more than 2-3 meters is desired. As shown, the module 200 includes several circuits including a power generation and regulation circuit 202, a digital command decoder and control circuit 204, a sensor interface module 206, a C1G2 interface protocol circuit 208, and a power source (battery) 210. A display driver module 212 can be added to drive a display.

A forward link AM decoder 216 uses a simplified phase-lock-loop oscillator that requires only a small amount of chip area. Preferably, the circuit of the decoder 216 requires only a minimum string of reference pulses.

A backscatter modulator block 218 preferably increases the backscatter modulation depth to more than 50%.

A memory cell, e.g., EEPROM, is also present, and preferably has a capacity from several kilobytes to one megabyte or more. In one embodiment, a pure, Fowler-Nordheim direct-tunneling-through-oxide mechanism 220 is present to reduce both the WRITE and ERASE currents to about 2 µA/cell in the EEPROM memory array. Unlike any RFID tags built to date, this permits reliable tag operation at maximum range even when WRITE and ERASE operations are being performed. In other embodiments, the WRITE and ERASE currents may be higher or lower, depending on the type of memory used and its requirements.

Preferably, the amount of memory available on the chip or otherwise is adequate to store data such that the external device need not be in active communication with the remote device.

The module 200 may also incorporate a security encryption circuit 222 for operating under one or more security schemes, secret handshakes with readers, etc.

The RFID device may have a dedicated power supply, e.g. battery; may draw power from a power source of the electronic device (e.g., battery, AC adapter, etc.); or both. Further, the RFID device may include a supplemental power source. Note that while the present description refers to a "supplemental" power source, the supplemental power source may indeed be the sole device that captures energy from outside the tag, be it from solar, RF, kinetic, etc. energy.

Note that while the foregoing has been described in terms of a semi-passive tag, various embodiments may be used in conjunction with passive as well as active tags.

When RF devices, including RFID readers, try to communicate at the same time, they may cause interference which may render effective communication between the RF devices difficult or impossible. Reader discipline, according to one embodiment, requires no central controlling device, as is used in reader orchestration. Also, according to another embodiment, reader discipline does not require the applications seeking to take advantage of the RF devices' capabilities to be cognizant of any other demands being made on the system. Therefore, in this embodiment, the author of the application is not required to implement a second set of application programming interface (API) calls, as would be required if the application had to communicate with a central coordinating device. The application writer can treat the system as if he is the only user of the system, greatly simplifying the work required to implement any particular function. This embodiment has the further advantages that the overall performance of the system may be optimized: first, because it avoids the bottleneck of the central coordinating device; and second, the RF devices each know the real time demand, and can reorder their operations optimally. Legacy applications and applications not written to the central coordinating device's API would interfere with the reader orchestration technique. However, reader discipline, according to some embodiments, does not require any change in the application. Reader orchestration forces a system to use a single API while reader discipline, in some embodiments, would allow any and all API's to work together.

Figure 2B:
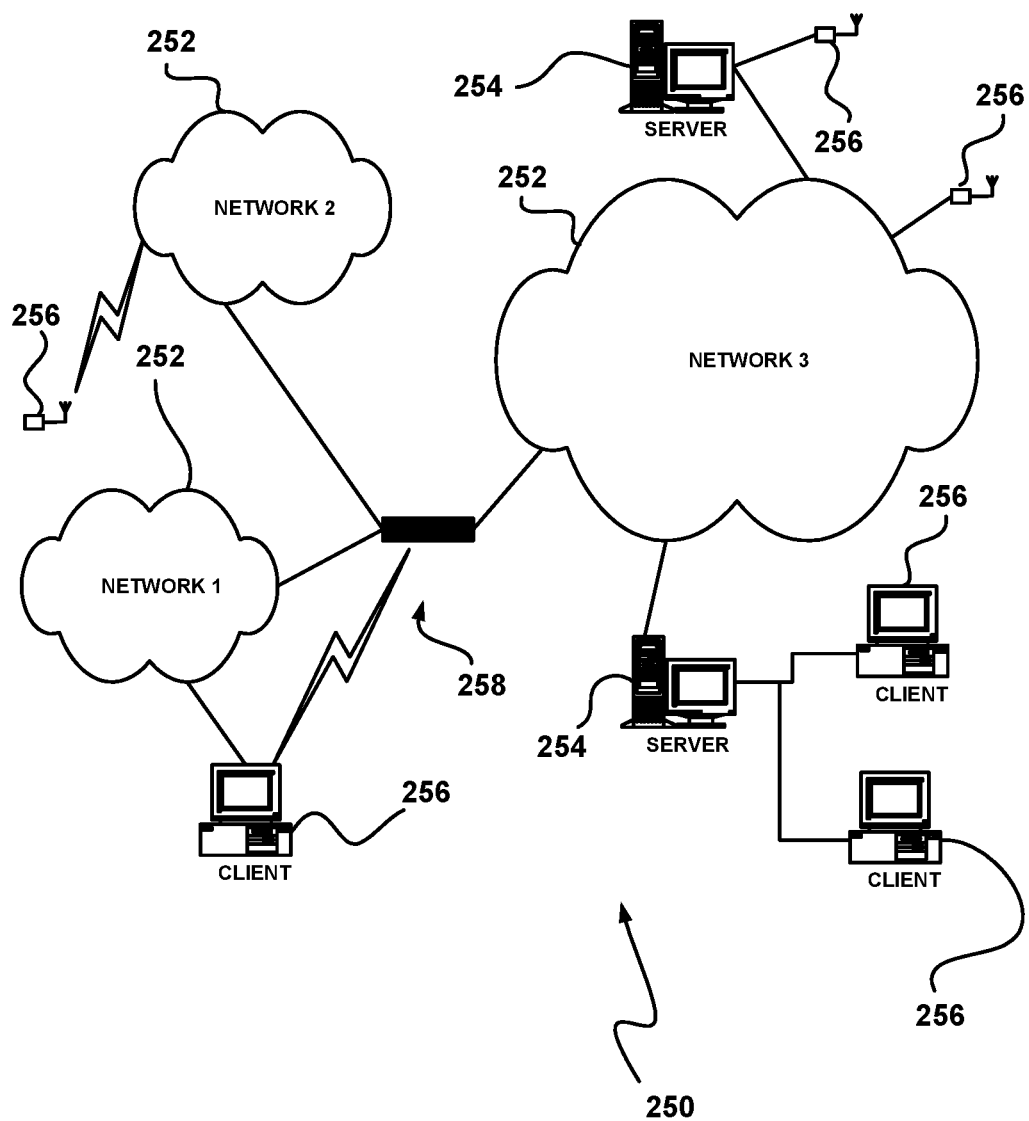
FIG. 2B is a simplified diagram of a network that can include RFID devices.

FIG. 2B illustrates a network architecture 250, in accordance with one embodiment. As shown, a plurality of networks 252 is provided. In the context of the present network architecture 250, the networks 252 may each take any form including, but not limited to a local area network (LAN), a wireless network, a wide area network (WAN) such as the Internet, peer-to-peer network, etc.

Coupled to the networks 252 are servers 254 which are capable of communicating over the networks 252. Also coupled to the networks 252 and the servers 254 is a plurality of clients 256. Such servers 254 and/or clients 256 may each include a desktop computer, lap-top computer, hand-held computer, RFID device 102 including RFID tags, mobile phone, smart phone and other types of mobile media devices (with or without telephone capability), personal digital assistant (PDA), peripheral (e.g. printer, etc.), any component of a computer, and/or any other type of logic. In order to facilitate communication among the networks 252, at least one gateway 258 is optionally coupled therebetween.

Figure 3:
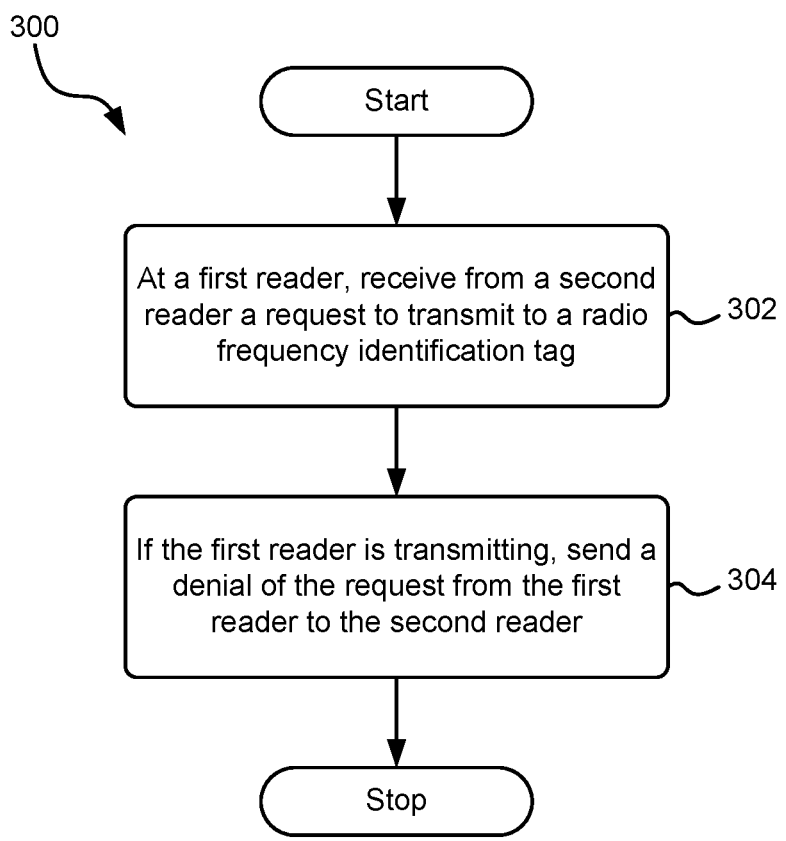
FIG. 3 is a flow chart of a method for coordinating reader transmissions according to one embodiment.

Now referring to FIG. 3, in one embodiment, a method 300 for coordinating reader transmissions is shown. As an option, the present method 300 may be implemented in the context of the functionality and architecture of FIGS. 1, 2A, and 2B. Of course, the method 300 may be carried out in any desired environment. It should also be noted that the aforementioned definitions may apply during the present description. In operation 302, at a first reader, a request to transmit to an RFID tag is received from a second reader. In another approach, the request to transmit to an RFID tag may be received from some other RF device.

In operation 304, if the first reader is transmitting, a denial of the request from the first reader is sent to the second reader. This denial may preempt the second reader from transmitting, or it may invoke a response from the second reader that may be sent to the first reader, or some other device.

In other embodiments, the readers may communicate directly with each other via RF signal and/or network using standard or proprietary protocols. For example, the readers may send requests and denials directly to each other via RF signals, or they may send requests and denials directly to each other via a network. A network may include hardwired and/or wireless components.

In another embodiment, the first reader may send a completion notice to the second reader upon completion of the transmitting. The completion notice may be sent once or multiple times over a predetermined time. In addition, the completion notice may contain other information that can be useful in reader discipline, such as which reader should transmit next, which readers are currently waiting to transmit, etc.

In yet another embodiment, the second reader may transmit to the RFID tag if no denial of the request is received after a predetermined amount of time has elapsed since the second reader transmitted the request to transmit. In another approach, the second reader may send out requests to transmit to the RFID tag at predetermined intervals until it receives no denial from the first reader.

In still another embodiment, the first and second readers may receive a request to transmit from a third reader, where the first reader may be transmitting and the second reader may be waiting to transmit, and each may send a denial of the third reader's request. Further, the third reader may wait until the second reader completes transmission before attempting to communicate with an RFID tag. In another approach, the first and second readers may receive a request to transmit from a third reader, where the second reader may be transmitting and the first reader may be waiting to transmit, and each may send a denial of the third reader's request. The third reader may wait until the first reader completes transmission before attempting to communicate with an RFID tag. In yet another approach, the third reader may send requests at predetermined time intervals until it does not receive a denial from the first or second reader before transmitting to an RFID tag.

In another approach, the first and second readers may receive a request to transmit from a third reader, where the request from the third reader may include a request for priority, where if the first reader is transmitting and the second reader is waiting to transmit, the first reader may abort transmitting and the second reader may wait to transmit to the RFID tag until after the third reader communicates with an RFID tag. In another approach, the second reader may be transmitting and the first reader may be waiting, and the request from the third reader may include a request for priority, where if the second reader is transmitting and the first reader is waiting to transmit, the second reader may abort transmitting and the first reader may wait to transmit to the RFID tag until after the third reader communicates with an RFID tag. In addition, the request for priority may be in compliance with a preset priority level, such as a priority table, where different requests for priority have different levels have priority, such that a reader transmitting at a higher priority level will not be interrupted if the request for priority received from another reader is of a lower priority level based on the priority table.

In yet another approach, the first and second readers may receive a request to transmit from a third reader. The request from the third reader may include a request for priority. If the first reader is transmitting and the second reader is waiting to transmit, the first reader may send a denial of the third reader's request, and the second reader may wait to transmit to the RFID tag until after the third reader communicates with an RFID tag.

Figure 4:
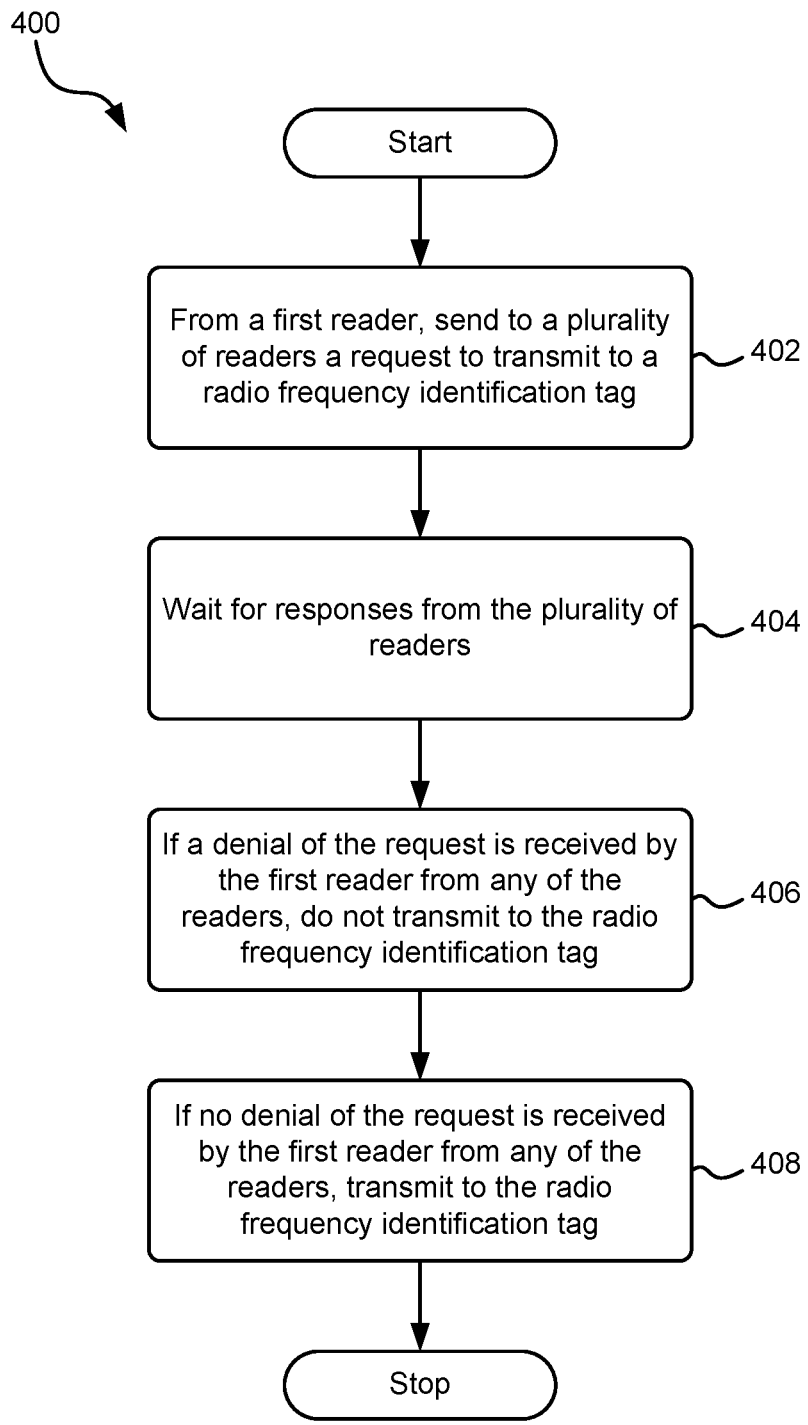
FIG. 4 is a flow chart of a method for coordinating reader transmissions according to one embodiment.

With reference to FIG. 4, a method 400 for coordinating reader transmissions is shown according to one embodiment. As an option, the present method 400 may be implemented in the context of the functionality and architecture of FIGS. 1, 2A, and 2B. Of course, the method 400 may be carried out in any desired environment. It should also be noted that the aforementioned definitions may apply during the present description. In operation 402, a request from a first reader is sent to a plurality of readers to transmit to an RFID tag.

In operation 404, responses from the plurality of readers are waited for. For example, the first reader may wait for a predetermined amount of time to receive a denial of the request to transmit to an RFID tag.

In operation 406, if a denial of the request is received by the first reader from any of the readers, no transmission is made to the RFID tag. In another approach, the first reader may send out requests to transmit to an RFID tag at predetermined time intervals until a denial is not received from the plurality of readers.

In operation 408, if no denial of the request is received by the first reader from any of the readers, the RFID tag is transmitted to. For example, a reader which requests to transmit may transmit after not receiving a denial of the request or after receiving acceptance to transmit from each of the readers.

In other embodiments, the readers may communicate directly with each other via RF signal and/or network. For example, the readers may send requests and denials directly to each other via RF signals, or they may send requests and denials directly to each other via a network. A network may include hardwired and/or wireless components.

In another embodiment, if a denial of the request is received by any reader, the reader receiving the denial will await the receipt of a completion notice that will be sent from the reader sending the denial after completion of transmission with an RFID tag. The completion notice may be sent once or multiple times over a predetermined time. In addition, the completion notice may contain other information that can be useful in reader discipline, such as which reader should transmit next, which readers are currently waiting to transmit, etc.

In yet another embodiment, the first reader may transmit to the RFID tag if no denial is received after a predetermined amount of time has elapsed since the first reader transmitted the request to transmit. In another embodiment, the request may be sent a predetermined number of times with a pause of a predetermined length between each request, and if no denial is received after the last request, the first reader may transmit to the RFID tag.

In one more embodiment, a request to transmit may be received from another reader, wherein if the first reader is transmitting or the first reader is waiting to transmit, a denial of the other reader's request may be sent from the first reader. Further, the other reader may wait until the first reader completes transmission before attempting to communicate with an RFID tag. In another approach, the other reader may send requests at predetermined time intervals until a denial is not received from the first reader.

In still another embodiment, a reader may receive a request to transmit from another reader, wherein the request from the other reader may include a request for priority. If the first reader is transmitting, the first reader may abort transmitting and the first reader may wait to retransmit to the RFID tag until after the other reader transmits with an RFID tag. In yet another approach, the first reader may send requests at predetermined time intervals aborting transmitting until it does not receive a denial from any other reader before transmitting to an RFID tag. In addition, the request for priority may be in compliance with a preset priority level, such as a priority table, where different requests for priority have different levels have priority, such that a reader transmitting at a higher priority level will not be interrupted if the request for priority received from another reader is of a lower priority level based on the priority table.

In one more embodiment, a first reader may receive a request to transmit from another reader, wherein the request from the other reader may include a request for priority. If the first reader is transmitting, and a second reader is waiting to transmit, the first reader may send a denial of the other reader's request. In addition, the second reader may wait to transmit to the RFID tag until after the other reader transmits with an RFID tag. In another approach, the second reader may transmit after the first reader finishes transmitting, and the other reader may wait until after the second reader transmits to the RFID tag.

Figure 5:
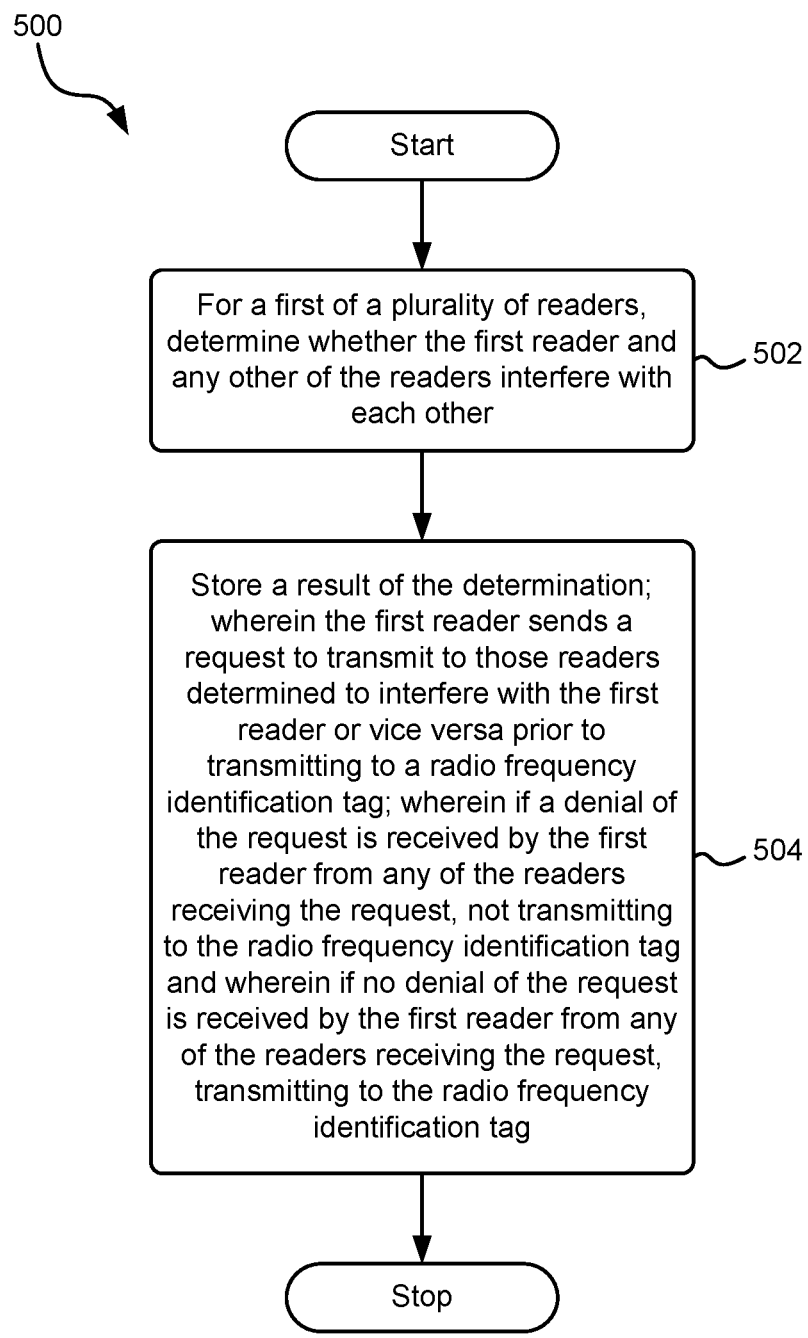
FIG. 5 is a flow chart of a method for coordinating reader transmissions according to one embodiment.

With reference to FIG. 5, a method 500 for coordinating reader transmissions is shown according to one embodiment. As an option, the present method 500 may be implemented in the context of the functionality and architecture of FIGS. 1, 2A, and 2B. Of course, the method 500 may be carried out in any desired environment. It should also be noted that the aforementioned definitions may apply during the present description. In operation 502, for a first of a plurality of readers, it is determined whether the first reader and any other of the readers interfere with each other.

In operation 504, a result of the determination is stored, where the first reader sends a request to transmit to those readers determined to interfere with the first reader or vice versa prior to transmitting to an RFID tag. If a denial of the request is received by the first reader from any of the readers receiving the request, the RFID tag is not transmitted to, and if no denial of the request is received by the first reader from any of the readers receiving the request, the RFID tag is transmitted to. The interference may be two way or one way such that one reader interferes with the other reader but not vice versa.

In one embodiment, the denial and the request may be sent once or multiple times over a predetermined time. In addition, the denial may contain other information that can be useful in reader discipline, such as which reader should transmit next, which readers are currently waiting to transmit, etc. Furthermore, in another embodiment, the request may be sent a predetermined number of times with a pause of a predetermined length between each request, and if no denial is received after the last request, the RFID tag may be transmitted to.

In another embodiment, the determination may be performed at startup of at least one of the readers. Also, determination may be performed prior to any activity or transmission by the readers. For example, one or more of the readers may be in a power-off mode or power standby mode, and when the reader is turned on, powered up, or otherwise activated for use, the determination may be performed.

In yet another embodiment, previous determinations may be stored for other readers. Also, the determination may involve only the at least one of the readers starting up in relation to the other readers. This includes whether the reader starting up interferes with the other readers, and/or whether the other readers interfere with the reader starting up.

In other embodiments, the first reader may store the result of the determination and the method may be performed for each of the readers. The storage of the determination may be accomplished with non-volatile memory included in the reader, such as flash memory, read-only memory (ROM), programmable read-only memory (PROM), etc., or with volatile memory included in the reader such as random access memory (RAM), dynamic random access memory (DRAM), static random access memory (SRAM), etc.

In still another embodiment, the readers may communicate with each other via RF signals and/or a network, each reader being assigned a network address for allowing the first reader to directly send the request to transmit to those readers determined to interfere with the first reader or vice versa. A network may include hardwired and/or wireless components.

In one more embodiment, only those readers determined to interfere with the first reader or vice versa may receive the request from the first reader. For example, since the transmission status of only readers that would interfere with transmissions from the first reader need be known to transmit from the first reader, there is no reason to transmit the request to all the readers. Conversely, if the first reader is transmitting, the other readers determined to interfere with the first reader will not be able to transmit without being interfered with by the first reader's transmission, so these readers determined to interfere with the first reader should know of the request from the first reader to know if they can transmit.

While much of the foregoing has been described in terms of use with RFID systems, it is again stressed that the various embodiments may be used in conjunction with other types of RF devices, such as receive-only RF devices, 1- and 2-way radios, etc.

The present description is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments discussed herein are implemented using the Internet as a means of communicating among a plurality of discrete systems. One skilled in the art will recognize that the present invention is not limited to the use of the Internet as a communication medium and that alternative methods of the invention may accommodate the use of a private intranet, a LAN, a WAN, a PSTN or other means of communication. In addition, various combinations of wired, wireless (e.g., radio frequency) and optical communication links may be utilized.

The program environment in which a present embodiment of the invention may be executed illustratively incorporates one or more general-purpose computers or special-purpose devices such facsimile machines and hand-held computers. Details of such devices (e.g., processor, memory, data storage, input and output devices) are well known and are omitted for the sake of clarity.

It should also be understood that the techniques presented herein might be implemented using a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, methods described herein may be implemented by a series of computer-executable instructions residing on a storage medium such as a carrier wave, disk drive, or computer-readable medium. Exemplary forms of carrier waves may be electrical, electromagnetic or optical signals conveying digital data streams along a local network or a publicly accessible network such as the Internet. In addition, although specific embodiments of the invention may employ object-oriented software programming concepts, the invention is not so limited and is easily adapted to employ other forms of directing the operation of a computer.

Various embodiments can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, nonvolatile memory device, etc.

Moreover, any of the devices described herein, including an RFID reader, may be considered a "computer."

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for coordinating reader transmissions, comprising: at a first reader, receiving from a second reader a request to transmit to a radio frequency identification tag; in response to receiving the request, determining whether the first reader is transmitting; and sending a denial of the request from the first reader to the second reader in response to determining that the first reader is transmitting;

Wherein the second reader transmits to the radio frequency identification tag in response to not receiving a denial of the request after a predetermined amount of time has elapsed since the second reader transmitted the request to transmit.

2. A method for coordinating reader transmissions, comprising: at a first reader, receiving from a second reader a request to transmit to a radio frequency identification tag; in response to receiving the request, determining whether the first reader is transmitting; and sending a denial of the request from the first reader to the second reader in response to determining that the first reader is transmitting;

Wherein the first and second readers receive a request to transmit from a third reader, wherein a denial of the third reader's request is sent from the first and second readers when the first reader is transmitting and the second reader is waiting to transmit.

3. The method of claim 2, wherein the third reader waits until the second reader completes transmission before attempting to communicate with a radio frequency identification tag.

4. A method for coordinating reader transmissions, comprising: from a first reader, sending to a plurality of readers a request to transmit to a radio frequency identification tag, the request being directed to the readers; waiting for responses from the plurality of readers; not transmitting to the radio frequency identification tag in response to the first reader receiving a denial of the request from any of the readers; and transmitting to the radio frequency identification tag in response to the first reader not receiving a denial of the request from any of the readers;

Comprising: receiving a request to transmit from another reader, wherein a denial of the other reader's request is sent from the first reader when the first reader is transmitting or the first reader is waiting to transmit.

5. The method of claim 4, wherein the other reader waits until the first reader completes transmission before attempting to communicate with a radio frequency identification tag.

6. A method for coordinating reader transmissions, comprising:

for a first of a plurality of readers, determining whether the first reader and any other of the readers interfere with each other; and storing a result of the determination;

wherein the first reader sends a request to transmit to those readers determined to interfere with the first reader or vice versa prior to transmitting to a radio frequency identification tag, the request to transmit being directed to those readers determined to interfere with the first reader or vice versa;

wherein the first reader does not transmit to the radio frequency identification tag in response to the first reader receiving a denial of the request from any of the readers the request was sent to; and wherein the first reader transmits to the radio frequency identification tag in response to the first reader not receiving a denial of the request from any of the readers the request was sent to.

7. The method of claim 6, wherein the determination is performed in response to activating at least one of the readers.

8. The method of claim 7, wherein previous determinations are stored for other readers, wherein the determination involves only the at least one of the readers activating in relation to the other readers.

9. The method of claim 6, wherein the first reader stores the result of the determination.

10. The method of claim 6, wherein the method is performed for each of the readers.

11. The method of claim 6, wherein the readers communicate with each other via a network, each reader being assigned a network address for allowing the first reader to directly send the request to transmit to those readers determined to interfere with the first reader or vice versa.

12. The method of claim 6, wherein only those readers determined to interfere with the rust reader err vice versa receive the request from the fast reader.

13. A system, comprising:
a processing circuit;
memory coupled to the processing circuit; and
an antenna coupled to the processing circuit,
wherein the processing circuit is configured to:
determine whether a first of a plurality of readers and any other of the readers interfere with each other,
store a result of the determination;
store a request to transmit from the first reader to those readers determined to interfere with the first reader or vice versa prior to transmitting to a radio frequency identification tag, the request to transmit being directed to those readers determined to interfere with the first reader or vice versa;
not transmit to the radio frequency identification tag in response to the first reader receiving a denial of the request from any of the readers receiving the request; and
transmit to the radio frequency identification tag in response to the first reader not receiving a denial of the request from any of the readers receiving the request.

14. A computer program product comprising a non-transitory computer readable medium having computer code thereon, which when executed by a reader causes the reader to:
determine whether a first of a plurality of readers and any other of the readers interfere with each other; and
store a result of the determination;
send a request to transmit from the first reader to those readers determined to interfere with the first reader or vice versa prior to transmitting to a radio frequency identification tag, the request to transmit being directed to those readers determined to interfere with the first reader or vice versa;
not transmit to the radio frequency identification tag in response to the first reader receiving a of the request from any of the readers receiving the request; and
transmit to the radio frequency identification tag in response to the first reader not receiving a denial of the request from any of the readers receiving the request.

* * * * *